United States Patent
Wang et al.

(10) Patent No.: US 10,257,880 B2
(45) Date of Patent: Apr. 9, 2019

(54) DEVICE-TO-DEVICE WIRELESS COMMUNICATION METHOD AND USER EQUIPMENT

(71) Applicant: Sun Patent Trust, New York, NY (US)

(72) Inventors: Lilei Wang, Beijing (CN); Prateek Basu Mallick, Hessen (DE); Hidetoshi Suzuki, Kanagawa (JP); Joachim Loehr, Hessen (DE); Masayuki Hoshino, Kanagawa (JP)

(73) Assignee: Sun Patent Trust, New York, NY (US)

( * ) Notice: Subject to any disclaimer, the term of this patent is extended or adjusted under 35 U.S.C. 154(b) by 103 days.

(21) Appl. No.: 15/377,931

(22) Filed: Dec. 13, 2016

(65) Prior Publication Data

US 2017/0094709 A1 Mar. 30, 2017

Related U.S. Application Data

(63) Continuation of application No. PCT/CN2014/087563, filed on Sep. 26, 2014.

(51) Int. Cl.
*H04W 76/23* (2018.01)
*H04W 72/02* (2009.01)
(Continued)

(52) U.S. Cl.
CPC ........... *H04W 76/23* (2018.02); *H04W 72/02* (2013.01); *H04W 72/10* (2013.01); *H04W 36/03* (2018.08)

(58) Field of Classification Search
None
See application file for complete search history.

(56) References Cited

U.S. PATENT DOCUMENTS 9,591,686 B2 * 3/2017 Zisimopoulos ....... H04W 48/02
9,756,676 B2 * 9/2017 Liu ....................... H04W 76/04
(Continued)

FOREIGN PATENT DOCUMENTS

| JP | 2017-514355 A | 6/2017 |
| WO | 2012/102546 A2 | 8/2012 |
| WO | 2015/139684 A1 | 9/2015 |

OTHER PUBLICATIONS

Extended European Search Report, dated Sep. 27, 2017, for corresponding European Patent Application No. 14902505.8-1505 / 3198933, 9 pages.
(Continued)

*Primary Examiner* — Michael J Moore, Jr.
(74) *Attorney, Agent, or Firm* — Seed IP Law Group LLP

(57) ABSTRACT

Provided are D2D wireless communication methods and UEs therefor. In one embodiment, the D2D wireless communication method performed by a UE includes continuing D2D transmission by using a resource from a resource pool allocated for mode 2 operation when switching from mode 1 operation to mode 2 operation. In another embodiment, the D2D wireless communication method performed by a UE includes performing D2D transmission by using a resource from a resource pool allocated for mode 2 operation, wherein the resource pool is indicated by a dedicated RRC signaling transmitted by an eNB, a SIB transmitted by an eNB, a PD2DSCH transmitted by other UE(s), and/or pre-configuration, and the dedicated RRC signaling, the SIB, the PD2DSCH and the pre-configuration are in descending order in priority when determining the resource pool.

18 Claims, 4 Drawing Sheets

200

201

CONTINUING D2D TRANSMISSION BY USING A RESOURCE FROM A TRANSMISSION RESOURCE POOL ALLOCATED FOR MODE 2 OPERATION WHEN SWITCHING FROM MODE 1 OPERATION TO MODE 2 OPERATION

(51) Int. Cl.
*H04W 72/10* (2009.01)
*H04W 36/00* (2009.01)

(56) References Cited

U.S. PATENT DOCUMENTS

| | | | | |
|---|---|---|---|---|
| 9,769,644 | B2* | 9/2017 | He | H04W 8/005 |
| 9,781,585 | B2* | 10/2017 | Sheng | H04W 8/005 |
| 9,832,807 | B2* | 11/2017 | Chen | H04W 76/23 |
| 9,843,918 | B2* | 12/2017 | Luo | H04W 8/005 |
| 9,848,454 | B2* | 12/2017 | Patil | H04W 76/14 |
| 10,051,678 | B2* | 8/2018 | Yamada | H04W 76/14 |
| 2014/0376458 | A1* | 12/2014 | Ryu | H04W 72/085 370/329 |
| 2015/0215981 | A1* | 7/2015 | Patil | H04W 76/023 370/329 |
| 2015/0271861 | A1* | 9/2015 | Li | H04W 56/001 455/426.1 |
| 2015/0327312 | A1* | 11/2015 | Burbidge | H04W 72/14 370/329 |
| 2017/0006585 | A1* | 1/2017 | Jung | H04W 72/042 |
| 2017/0041773 | A1* | 2/2017 | Fujishiro | H04W 8/005 |
| 2017/0135074 | A1* | 5/2017 | Yi | H04W 8/005 |
| 2017/0295567 | A1* | 10/2017 | Chen | H04W 72/0406 |
| 2017/0303240 | A1* | 10/2017 | Basu Mallick | H04W 72/04 |
| 2017/0353848 | A1* | 12/2017 | He | H04L 5/0069 |

OTHER PUBLICATIONS

3GPP TR 36.843 V12.0.1, "3rd Generation Partnership Project; Technical Specification Group Radio Access Network; Study on LTE Device to Device Proximity Services; Radio Aspects (Release 12)", Mar. 2014, 50 pages.
Fodor et al., "'Design Aspects of Network Assisted Device-to-Device Communications'", IEEE Communications Magazine, Mar. 2012, 8 pages.
3GPP TSG RAN1, "3GPP RAN1 #78 Meeting Release 12 on D2D, Small Cell Low Cost MTC;", Dresden, Germany, Aug. 22, 2014, 68 pages.
3GPP TS 36.213 V12.2.0, "$3^{rd}$ Generation Partnership Project; Technical Specification Group Radio Access Network; Evolved Universal Terrestrial Radio Access (E-UTRA); Physical layer procedures (Release 12)," Jun. 2014, 207 pages.
International Search Report dated Jul. 17, 2015, for corresponding International Application No. PCT/CN2014/087563, 2 pages.
Alcatel-Lucent, Alcatel-Lucent Shanghai Bell, Mode Configuration and switching[online], 3GPP TSG-RAN WG2#86 R2-142584, Retrieved from the Internet: URL:http://www.3gpp.org/ftp/tsg_ran/WG2_RL2/TSGR2_86/Docs/R2-142584.zip, May 16, 2014.
Sony, D2D Resource Allocation Mode Selection and exceptional cases[online], 3GPP TSG-RAN WG2#87 R2-143152, Retrieved from the Internet: URL:http://www.3gpp.org/ftp/tsg_ran/WG2_RL2/TSGR2_87/Docs/R2-143152.zip, Aug. 22, 2014.
Ericsson, Frame Structure for D2D-Enabled LTE Carriers and Resources Configuration[online], 3GPP TSG-RAN WG1#78 R1-143367, Retrieved from the Internet: URL:http://www.3gpp.org/ftp/tsg_ran/WG1_RL1/TSGR1_78/Docs/R1-143367.zip, Aug. 22, 2014.

* cited by examiner

600

PERFORMING D2D WIRELESS COMMUNICATION TRANSMISSION BY USING A RESOURCE FROM A TRANSMISSION RESOURCE POOL ALLOCATED FOR MODE 2 OPERATION — 601

DEVICE-TO-DEVICE WIRELESS COMMUNICATION METHOD AND USER EQUIPMENT

BACKGROUND

Technical Field

The present disclosure relates to the field of wireless communication, and in particular, to device-to-device (D2D) wireless communication methods and user equipments (UEs) therefor.

Description of the Related Art

Device-to-device (D2D) wireless communication is a new topic in 3GPP (3rd Generation Partnership Project) LTE (Long Term Evolution) Release 12. D2D communication could happen with wireless network coverage (e.g., for commercial case) or without network coverage (e.g., for public safety). FIG. 1 illustrates exemplary D2D communications with and without wireless network coverage. On the left side of FIG. 1, UE 101 and UE 102 are within the wireless network coverage of eNB (eNode B) 103, but they are communicating with each other directly (i.e., not through eNB 103). On the right side of FIG. 1, UE 104 and UE 105 are not within any wireless network coverage, and they are communicating with each other directly.

When UEs with D2D communication capability (D2D UEs) are with wireless network coverage, i.e., in LTE Wide Area Network (WAN), D2D UEs may operate with LTE WAN and D2D simultaneously, which means that in some radio resources/subframes, D2D UEs transmit/receive LTE WAN signals, but in other radio resources/subframes, D2D UEs transmit/receive D2D signals. Currently, from resource allocation point of view, D2D UEs can operate in one of the following two modes (refer to LTE Rel. 12) for D2D communication:

Mode 1: eNodeB or LTE rel-10 relay node schedules the exact resources used by a UE to transmit direct data and direct control information;

Mode 2: a UE on its own selects resources from resource pools to transmit direct data and direct control information.

In mode 1, the resources of D2D transmission are allocated or fully controlled by an eNB, but in mode 2, the UE itself selects the resources for D2D transmission.

BRIEF SUMMARY

In one general aspect, the techniques disclosed here feature a device-to-device (D2D) wireless communication method performed by a user equipment (UE), including: continuing D2D transmission by using a resource from a transmission resource pool allocated for mode 2 operation when switching from mode 1 operation to mode 2 operation.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
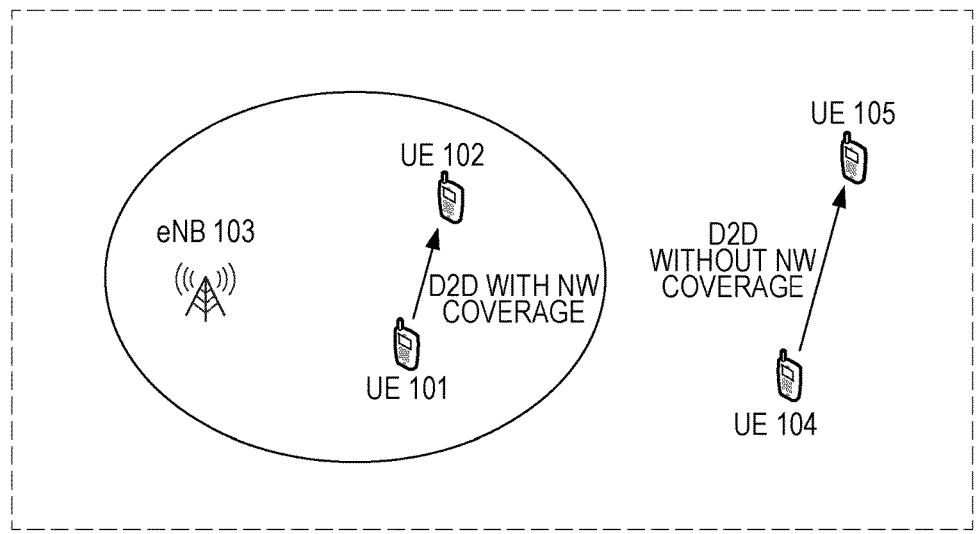
FIG. 1 illustrates exemplary D2D communications with and without wireless network coverage.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and made part of this disclosure.

First Embodiment

As described in the above, a UE can perform D2D communication in mode 1 or mode 2. In some cases, the UE may need to switch from mode 1 operation to mode 2 operation. For example, the UE operating in mode 1 may need to carry out mode 2 transmission to keep continuous D2D operation in some exceptional cases in which the UE cannot operate in mode 1 temporarily. In other words, the switching from mode 1 operation to mode 2 operation can be triggered by an exceptional case in which the UE cannot operate in mode 1 temporarily. The candidate conditions to trigger such exceptional mode 2 transmission can for example be that the grant for ProSe communication is not received within a period after sending ProSe-BSR, or the grant for ProSe-BSR is not received within a period after initiation of resource request for ProSe communication.

When a UE switches from mode 1 operation to mode 2 operation, what resource the UE would use and how the UE determines the resource for mode 2 operation become important issues, especially in an exceptional case. In a first embodiment of the present disclosure, it is provided that the UE continues D2D transmission by using a resource from a transmission resource pool allocated for mode 2 operation when switching from mode 1 operation to mode 2 operation. In the embodiment, the eNB will not allocate special mode 2 resources for the switching, for example, will not allocate exceptional mode 2 resources; rather the UE uses a resource from a normal mode 2 transmission resource pool, i.e., transmission resource pool allocated for mode 2 operation.

Figure 2:
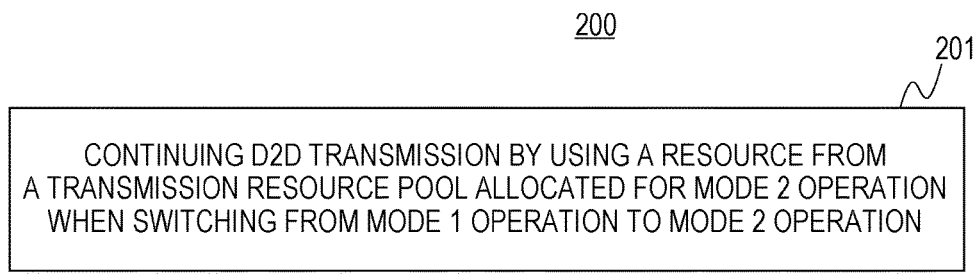
FIG. 2 illustrates a flowchart of a D2D wireless communication method according to a first embodiment of the present disclosure.

In particular, the first embodiment provides a D2D wireless communication method 200 performed by a UE as shown in FIG. 2 which illustrates a flowchart of the D2D wireless communication method 200 according to the first embodiment of the present disclosure. The method 200 includes a step 201 of continuing D2D transmission by using a resource from a transmission resource pool allocated for mode 2 operation when switching from mode 1 operation to mode 2 operation.

In the first embodiment, the transmission resource pool allocated for mode 2 operation, i.e., a normal mode 2 transmission resource pool which is not specific to the mode switching, is used to continue D2D communication when the UE switches from mode 1 to mode 2. Since no special resource is allocated for the switching and the normal mode 2 transmission resource pool is reused, the embodiment of the present disclosure saves sources, and potentially saves the signaling overhead for allocating the special switching resource.

Figure 3:
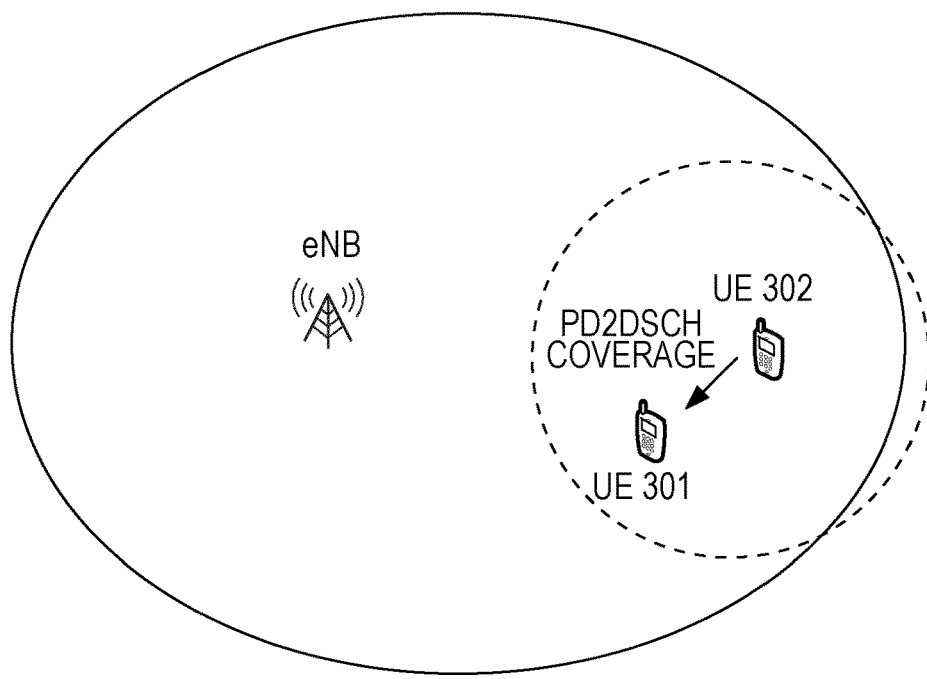
FIG. 3 illustrates a schematic diagram of the UE switching from mode 1 operation to mode 2 operation to receive PD2DSCH from another UE.

In an example of the first embodiment, the transmission resource pool can be indicated in a physical device-to-device shared channel (PD2DSCH) transmitted by one or more other UE(s). PD2DSCH is a D2D channel which was agreed in 3GPP RAN1 (refer to LTE Rel. 12) and used for in-coverage UEs to forward some synchronization/timing and resource pool/power control parameters to OOC UEs. The intention is to protect LTE WAN traffic and in-coverage model/2 transmissions. In the present disclosure, the UE switching from mode 1 operation to mode 2 operation can also receive PD2DSCH transmitted from one or more other UE(s), though it may be within the wireless network coverage, in order to get knowledge of the transmission resource pool for mode 2 operation. FIG. 3 illustrates a schematic diagram of the UE switching from mode 1 operation to mode 2 operation to receive PD2DSCH from another UE. In FIG. 3, UE 301 is the UE switching from mode 1 operation to mode 2, and UE 302 is the UE which forwards PD2DSCH. It can be seen that UE 301 is within the PD2DSCH coverage of UE 302, and thus UE 301 can receive PD2DSCH transmitted from UE 302. Specifically, if the PD2DSCH is transmitted by multiple UEs, soft combining can be used to receive the PD2DSCH. According to this example, the transmission resource pool for normal mode 2 operation can be indicated to the UE switching from mode 1 operation to mode 2 operation without additional signaling overhead.

Figure 4:
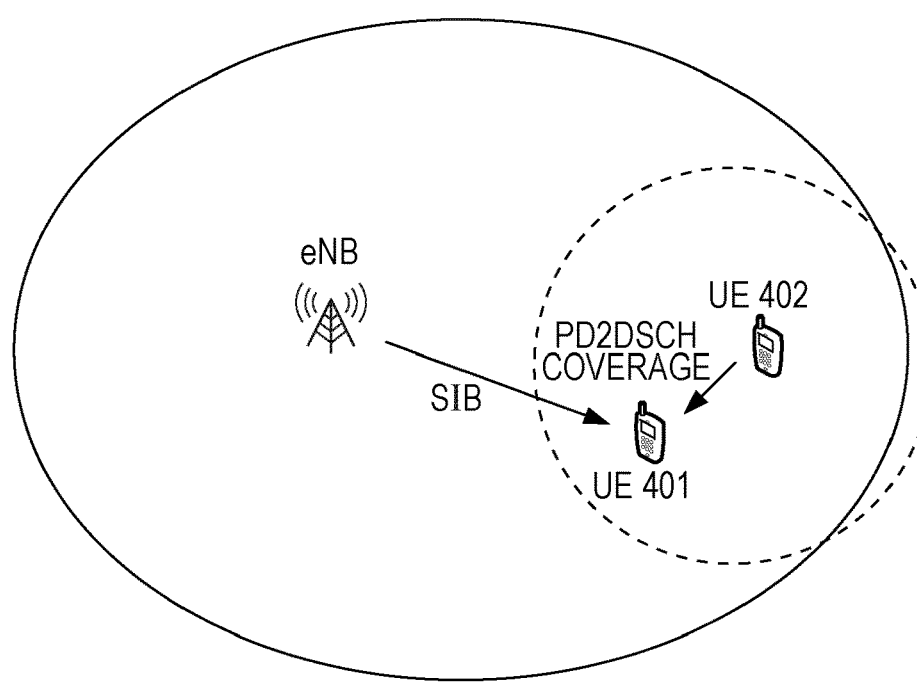
FIG. 4 illustrates a schematic diagram in which the UE switching from mode 1 operation to mode 2 operation receives resource pool indications from both the PD2DSCH and the SIB.

In other examples, the transmission resource pool can also be indicated by a dedicated RRC signaling transmitted by an eNB, a SIB transmitted by an eNB, or pre-configuration. In particular, sometimes, the UE switching from mode 1 operation to mode 2 operation may be able to obtain more than one resource pool indication. In this case, according to an example, the dedicated RRC signaling, the SIB, the PD2DSCH and the pre-configuration are in descending order in priority when determining the transmission resource pool. In other words, the priority of the dedicated RRC signaling is higher than the SIB, the priority of the SIB is higher than the PD2DSCH, and the priority of the PD2DSCH is higher than the pre-configuration. In conclusion, in this example, the transmission resource pool can be indicated by a dedicated RRC signaling transmitted by an eNB, a SIB transmitted by an eNB, a PD2DSCH transmitted by other UE(s), and/or pre-configuration, and the dedicated RRC signaling, the SIB, the PD2DSCH and the pre-configuration are in descending order in priority when determining the transmission resource pool. FIG. 4 illustrates a schematic diagram in which the UE 401 switching from mode 1 operation to mode 2 operation receives resource pool indications from both the PD2DSCH and the SIB. In this case, the UE 401 will select the resource pool indicated in the SIB since the priority of the SIB is higher than the PD2DSCH. Accordingly, at the receiving side, any receiving UE can receive D2D signals in a union of indicated or pre-configured D2D receiving resource pool(s), wherein the indicated D2D receiving resource pool(s) can be a receiving resource pool indicated by the RRC signaling transmitted by an eNB, a receiving resource pool indicated by the SIB transmitted by an eNB, and/or a receiving resource pool indicated by the PD2DSCH transmitted by other UE(s). Herein, the D2D receiving resource pool refers to a resource pool for receiving D2D signals. It is noted that if only one receiving resource pool is indicated or pre-configured, the union of it is the one receiving resource pool itself.

Figures 5, 6:
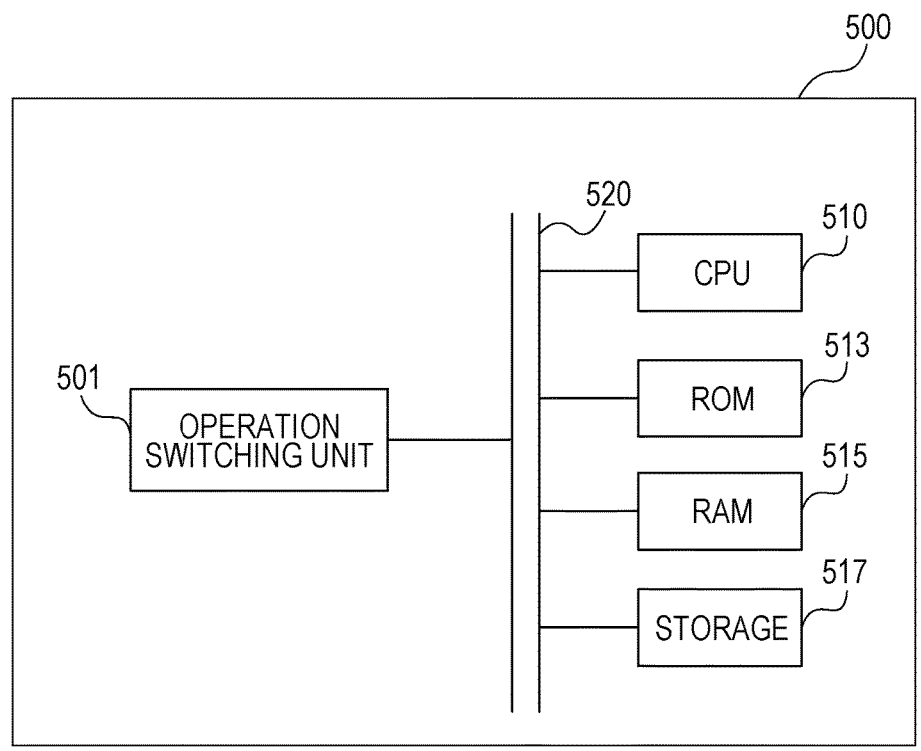
FIG. 5 is a block diagram illustrating a UE according to the first embodiment of the present disclosure.
FIG. 6 illustrates a flowchart of a D2D wireless communication method according to a second embodiment of the present disclosure.

In the first embodiment, a UE for D2D wireless communication is also provided. FIG. 5 is a block diagram illustrating a UE 500 according to the first embodiment of the present disclosure. UE 500 includes an operation switching unit 501. The operation switching unit 501 can be configured to continue D2D transmission by using a resource from a transmission resource pool allocated for mode 2 operation when switching from mode 1 operation to mode 2 operation.

The UE 500 according to the present disclosure may optionally include a CPU (Central Processing Unit) 510 for executing related programs to process various data and control operations of respective units in the UE 500, a ROM (Read Only Memory) 513 for storing various programs required for performing various process and control by the CPU 510, a RAM (Random Access Memory) 515 for storing intermediate data temporarily produced in the procedure of process and control by the CPU 510, and/or a storage unit 517 for storing various programs, data and so on. The above operation switching unit 501, CPU 510, ROM 513, RAM 515 and/or storage unit 517, etc., may be interconnected via data and/or command bus 520 and transfer signals between one another.

Respective units as described above do not limit the scope of the present disclosure. According to one implementation of the disclosure, the functions of the above operation switching unit 501 may be implemented by hardware, and the above CPU 510, ROM 513, RAM 515 and/or storage unit 517 may not be necessary. Alternatively, the functions of the above operation switching unit 501 may also be implemented by functional software in combination with the above CPU 510, ROM 513, RAM 515 and/or storage unit 517, etc.

Second Embodiment

In the second embodiment of the present disclosure, the priority rule on mode 2 resource selection mentioned in the first embodiment can be extended to any mode 2 operation, and it is not limited to the switching from mode 1 to mode 2, and especially, not limited to the exceptional case mentioned in the first embodiment.

In particular, the second embodiment provides a D2D wireless communication method 600 performed by a UE as shown in FIG. 6 which illustrates a flowchart of the D2D wireless communication method 600 according to the second embodiment of the present disclosure. The method 600 includes a step 601 of performing D2D transmission by using a resource from a transmission resource pool allocated for mode 2 operation. In the second embodiment, the transmission resource pool is indicated by a dedicated RRC signaling transmitted by an eNode B (eNB), a system information block (SIB) transmitted by an eNB, a physical device-to-device shared channel (PD2DSCH) transmitted by other UE(s), and/or pre-configuration, and the dedicated RRC signaling, the SIB, the PD2DSCH and the pre-configuration are in descending order in priority when determining the transmission resource pool. It is noted that related descriptions in the first embodiment can also be applied to the second embodiment, which are not described repeatedly here.

In particular, for mode 2 UEs with RRC_CONNECTED status, the following priority rule can be applied: Dedicated RRC signaling indicated>SIB indicated>PD2DSCH indicated>Preconfigured. For mode 2 UEs with RRC_IDLE status, the following priority rule can be applied: SIB indicated>PD2DSCH indicated>Preconfigured. For OOC UEs which are close to an LTE WAN cell and can receive PD2DSCH information, the following priority rule can be applied: PD2DSCH indicated>Preconfigured.

Figure 7:
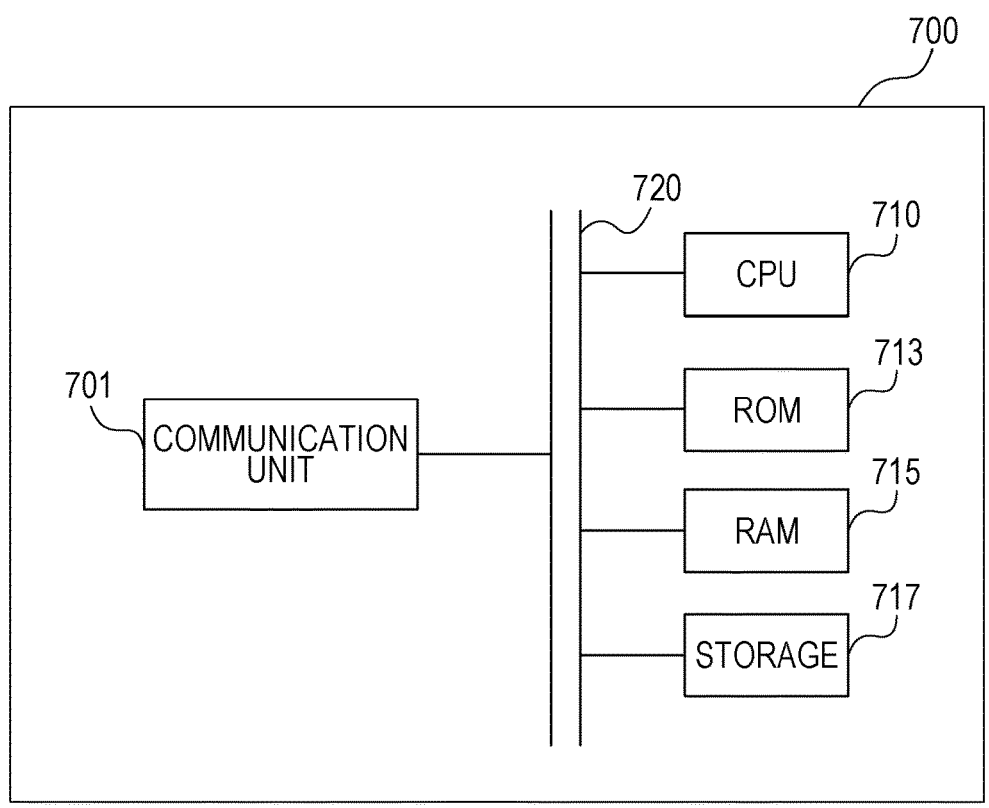
FIG. 7 is a block diagram illustrating a UE according to the second embodiment of the present disclosure.

In the second embodiment, a UE for D2D wireless communication is also provided. FIG. 7 is a block diagram illustrating a UE 700 according to the second embodiment of the present disclosure. UE 700 includes a communication unit 701. The communication unit 701 can be configured to perform D2D transmission by using a resource from a transmission resource pool allocated for mode 2 operation, wherein the transmission resource pool is indicated by a dedicated RRC signaling transmitted by an eNode B (eNB), a system information block (SIB) transmitted by an eNB, a physical device-to-device shared channel (PD2DSCH) transmitted by other UE(s), and/or pre-configuration, and the dedicated RRC signaling, the SIB, the PD2DSCH and the pre-configuration are in descending order in priority when determining the transmission resource pool.

The UE 700 according to the present disclosure may optionally include a CPU (Central Processing Unit) 710 for executing related programs to process various data and control operations of respective units in the UE 700, a ROM (Read Only Memory) 713 for storing various programs required for performing various process and control by the CPU 710, a RAM (Random Access Memory) 715 for storing intermediate data temporarily produced in the procedure of process and control by the CPU 710, and/or a storage unit 717 for storing various programs, data and so on. The above communication unit 701, CPU 710, ROM 713, RAM 715 and/or storage unit 717, etc., may be interconnected via data and/or command bus 720 and transfer signals between one another.

Respective units as described above do not limit the scope of the present disclosure. According to one implementation of the disclosure, the functions of the above communication unit 701 may be implemented by hardware, and the above CPU 710, ROM 713, RAM 715 and/or storage unit 717 may not be necessary. Alternatively, the functions of the above communication unit 701 may also be implemented by functional software in combination with the above CPU 710, ROM 713, RAM 715 and/or storage unit 717, etc.

Accordingly, at the receiving side, there are provided a device-to-device (D2D) wireless communication method performed by a user equipment (UE) and a corresponding UE. The communication method includes receiving D2D signals in a union of indicated or pre-configured D2D receiving resource pool(s). The UE includes a communication unit configured to receive D2D signals in a union of indicated or pre-configured D2D receiving resource pool(s). Here, the indicated D2D receiving resource pool(s) are a receiving resource pool indicated by a dedicated radio resource control (RRC) signaling transmitted by an eNode B (eNB), a receiving resource pool indicated by a system information block (SIB) transmitted by an eNB, and/or a receiving resource pool indicated by a physical device-to-device shared channel (PD2DSCH) transmitted by other UE(s). It is noted that the above descriptions concerning the communication method 600 and the UE 700 can also be applied here unless the context indicates otherwise.

The present disclosure can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used. Further, the calculation of each functional block can be performed by using calculating means, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

The invention claimed is:

1. A communication apparatus comprising:
    control circuitry, which, in operation, detects temporal inability to perform device to device (D2D) communication in mode 1 and determines a resource pool for the D2D communication, wherein mode 1 is a transmission mode in which an eNode B schedules resources for the D2D communication; and
    a transmitter, which, responsive to the control circuitry detecting the temporal inability, continues the D2D communication using the resource pool,
    wherein, the resource pool is indicated by one of dedicated Radio Resource Control (RRC) signaling from the eNode B, System Information Block (SIB) transmitted from the eNode B, and preconfiguration information, and
    a priority order of an indication of the resource pool is different in RRC_CONNECTED state than in RRC_IDLE state.

2. The communication apparatus according to claim 1, wherein, responsive to the control circuitry detecting the temporal inability, the control circuitry switches from mode 1 to mode 2 of the D2D communication, wherein mode 2 is another transmission mode in which the communication apparatus autonomously schedules resources for the D2D communication.

3. The communication apparatus according to claim 1, wherein the dedicated RRC signaling has higher priority in the RRC_CONNECTED state than in the RRC_IDLE state in determining the resource pool.

4. The communication apparatus according to claim 1, wherein the transmitter, in operation, transmits a D2D signal that is mapped to a resource within the resource pool.

5. The communication apparatus according to claim 1, wherein the resource pool includes a plurality of subframes, and the transmitter, in operation, transmits a D2D signal that is mapped to one of the plurality of subframes.

6. The communication apparatus according to claim 1, wherein the resource pool is configured for the D2D communication in mode 2.

7. The communication apparatus according to claim 1, comprising a receiver, which, in operation, receives at least one of the dedicated RRC signaling, the SIB, and the preconfiguration information.

8. A communication method comprising:
   detecting temporal inability of a communication apparatus to perform device to device (D2D) communication in mode 1 and determining a resource pool for the D2D communication, wherein mode 1 is a transmission mode in which an eNode B schedules resources for the D2D communication; and
   responsive to detecting the temporal inability, the communication apparatus continuing the D2D communication using the resource pool,
   wherein, the resource pool is indicated by one of dedicated Radio Resource Control (RRC) signaling from the eNode B, System Information Block (SIB) transmitted from the eNode B, and preconfiguration information, and
   a priority order of an indication of the resource pool is different in RRC_CONNECTED state than in RRC_IDLE state.

9. The communication method according to claim 8, comprising:
   responsive to detecting the temporal inability, the communication apparatus switching from mode 1 to mode 2 of the D2D communication, wherein mode 2 is another transmission mode in which the communication apparatus autonomously schedules resources for the D2D communication.

10. The communication method according to claim 8, wherein the dedicated RRC signaling has higher priority in the RRC_CONNECTED state than in the RRC_IDLE state in determining the resource pool.

11. The communication method according to claim 8, comprising:
    the communication apparatus transmitting a D2D signal that is mapped to a resource within the resource pool.

12. The communication method according to claim 8, wherein the resource pool includes a plurality of subframes, and the method comprises:
    the communication apparatus transmitting a D2D signal that is mapped to one of the plurality of subframes.

13. The communication method according to claim 8, wherein the resource pool is configured for the D2D communication in mode 2.

14. The communication method according to claim 8, comprising:
    the communication apparatus receiving at least one of the dedicated RRC signaling, the SIB, and the preconfiguration information.

15. The communication apparatus according to claim 2, wherein two or more resource pools for mode 2 are indicated in the D2D communication with the mode 1 using two or more different types of signaling.

16. The communication apparatus according to claim 15, wherein a first resource pool indicated by the dedicated RRC signaling from the eNode B is prioritized in the RRC_CONNECTED state, a second resource pool indicated by the SIB from the eNode B is prioritized in the RRC IDLE state.

17. The communication method according to claim 9, wherein two or more resource pools for mode 2 are indicated in the D2D communication with the mode 1 using two or more different types of signaling.

18. The communication method according to claim 17, wherein a first resource pool indicated by the dedicated RRC signaling from the eNode B is prioritized in the RRC_CONNECTED state, a second resource pool indicated by the SIB from the eNode B is prioritized in the RRC IDLE state.

* * * * *